(12) United States Patent  (10) Patent No.: US 8,402,760 B2
Knobloch  (45) Date of Patent: Mar. 26, 2013

(54) VIBRATION-DECOUPLING DEVICE FOR HYDRAULICS

(75) Inventor: Jurgen Knobloch, Ruderatshofen (DE)

(73) Assignee: AGCO GmbH, Marktoberdorf (DE)

( * ) Notice: Subject to any disclaimer, the term of this patent is extended or adjusted under 35 U.S.C. 154(b) by 965 days.

(21) Appl. No.: 12/397,862

(22) Filed: Mar. 4, 2009

(65) Prior Publication Data

US 2009/0288409 A1  Nov. 26, 2009

(30) Foreign Application Priority Data

Mar. 14, 2008 (DE) .......................... 10 2008 014 291

(51) Int. Cl.
*F16L 55/04* (2006.01)

(52) U.S. Cl. ......................................... 60/469; 285/224

(58) Field of Classification Search ................... 60/469; 285/224, 231, 133.11; 248/56
See application file for complete search history.

(56) References Cited

U.S. PATENT DOCUMENTS

| 1,783,410 | A | * | 12/1930 | Cowell ........................... 285/236 |
| 2,458,670 | A |   | 1/1949  | Young, Jr. |
| 5,527,130 | A | * | 6/1996  | Webb .............................. 405/52 |
| 6,045,163 | A |   | 4/2000  | Moffitt |

FOREIGN PATENT DOCUMENTS

| DE | 10233127 | 12/2003 |
| JP | 09119561 | 10/1995 |

* cited by examiner

*Primary Examiner* — Thomas E Lazo

(57) ABSTRACT

The invention concerns a vibration-decoupling device for a hydraulic circuit and in particular concerns a vibration-decoupling device for a hydraulic circuit used in an agricultural vehicle. The device has a fluid transfer element (3) able to be connected at one end (4) to a high pressure outlet of a hydraulic pump (1) and to transport fluid expelled from the pump. The another end (5) of the fluid transfer element (3) is moveably connected with a fixed element (11) such as a gear assembly housing so that the fluid can be passed to a hydraulic consumer. A support element (9) is moveably connected with the fixed element (11) and the fluid transfer element (3) and acts so that a force is exerted on the fluid transfer element (3) in one direction while the other end (5) of the fluid transfer element (3) and the fixed element (11) remain securely connected together.

20 Claims, 7 Drawing Sheets

VIBRATION-DECOUPLING DEVICE FOR HYDRAULICS

CROSS REFERENCE TO RELATED APPLICATION

The present application claims the benefit of and priority from German Patent Application No. DE 102008014291.3, filed Mar. 14, 2008, the entire disclosure of which is hereby incorporated by reference herein.

BACKGROUND OF THE INVENTION

The invention concerns a vibration-decoupling device for a hydraulic circuit and in particular concerns a vibration-decoupling device for a hydraulic circuit which is used in an agricultural vehicle.

In the prior art, motor vehicles, in particular agricultural utility vehicles e.g. tractors, are known in which working devices are guided or controlled, for example hydraulically operated wood cutters, hay makers or ploughs. For this the vehicle has a hydraulic circuit in which hydraulic fluid under high pressure is guided by a hydraulic pump to a consumer, for example a valve block. The hydraulic pump is often a piston pump which generates mechanical vibrations in operation. If the mechanical vibrations are transmitted from the pump to the consumer or vehicle, wear and maintenance costs are increased. Furthermore, noise emissions are increased and comfort reduced.

In the past, pipelines have been fitted between the hydraulic pump and the valve block. This does not allow decoupling of the mechanical vibrations between pump and consumer or vehicle, leading to the disadvantages above.

Furthermore, in the prior art hose lines have been fitted between the hydraulic pump and the valve block. This indeed leads to vibration decoupling between the hydraulic pump and valve block or vehicle and suppresses noise development. This measure however requires a large installation space because of the large bending radius of the hoses the use of costly components entails high costs and because of the lower wear resistance of the hoses in comparison with pipes, only offers restricted reliability. Furthermore, the pressure changes in the hose cause their deformation. This results in forces which act directly on the connections and connected assemblies such as the hydraulic pumps, increasing the load on these.

The object of the present invention is to eliminate the disadvantages above and in particular provide a vibration-decoupling device which suppresses vibration and noise development, entails low costs for installation and maintenance and has low wear and high reliability.

The object is achieved by a device according to claim 1. Advantageous refinements are the subject matter of the sub-claims.

BRIEF SUMMARY OF THE INVENTION

According to the invention, a vibration-decoupling device for hydraulics comprises a fluid transfer element with a first end and a second end, the first end being suitable for being connected with a high pressure outlet of a hydraulic pump for transporting a fluid expelled therefrom, a fixed element, for example a frame or a housing which is suitable for resisting mechanical vibrations and pulsations of the fluid caused by operation of the hydraulic pump, the device being characterised in that the second end of the fluid transfer element is moveable connected with the fixed element so that fluid can be passed to a hydraulic consumer, and in that a support element which is moveably connected with the fixed element and the fluid transfer element and acts so that a supporting force is exerted on the fluid transfer element in one direction while the second end of the fluid transfer element and the fixed element remain securely connected together.

If the fluid transfer element is formed as a pipe, the use of conventional components allows a further reduction in costs and lower wear.

If the fluid transfer element has a supply part, a connecting part and a discharge part, and if the supply part and discharge part is of tubular form, and the connecting part is structured such that it connects the supply part, discharge part and support element such that the fluid can be passed from the supply part to the discharge part, and at least one of the supply part, discharge part and support element is flexibly connected with the connecting part, the resulting flexible structure of the fluid transfer element further improves the decoupling of the mechanical vibrations between the hydraulic pump and the consumer.

If the support element is of tubular form and the connecting part is structured such that the discharge part and support element can be connected therewith deflectably and together form a pipe element, the system is hydraulically pressure balanced. This means that no external forces occur which cause a shift of the fluid transfer element or hydraulic pump.

The fluid transfer element and fixed element may be designed such that the fixed element has a first through hole and the other end of the fluid transfer element is connected in a fluid-tight manner with the first through hole such that a shift in the axial direction is possible in relation to the first through hole and a deflection of the fluid transfer element or part thereof by up to 5° in at least one direction orthogonal to the axial direction is possible.

The support element and the fixed element maybe designed so that the fixed element has a second through hole and the support element can be connected in a fluid-tight manner with the second through hole, so that a shift in the axial direction is possible in relation to the second through hole and a deflection of the support element thereof by up to 5° in at least one direction orthogonal to the axial direction of the second through hole is possible and a second consumer can be connected to the hydraulic circuit.

BRIEF DESCRIPTION OF THE DRAWINGS

The invention is described below with reference to an embodiment example and the accompanying figures.

DETAILED DESCRIPTION OF PREFERRED EMBODIMENT

Figure 1:
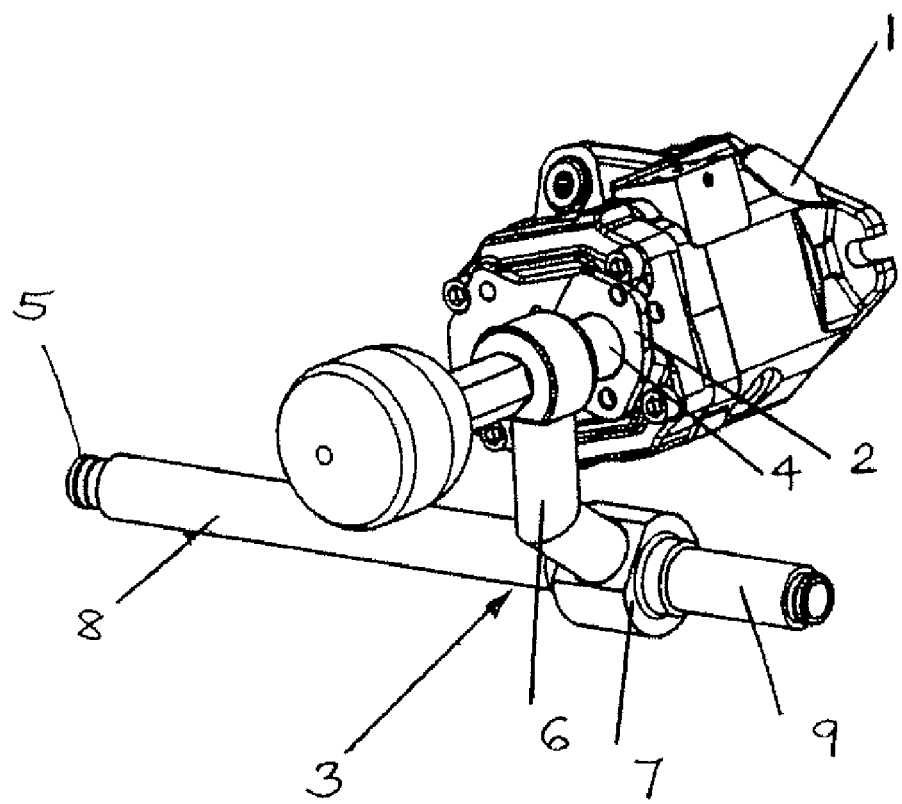
FIG. 1 shows a perspective angled view of a hydraulic pump with a fluid transfer element and a support element.

FIG. 1 shows a hydraulic pump 1 with a fluid outlet opening and a fluid transfer element 3. The fluid transfer element 3 has a first end 4 with a flange 2 and a second end 5 and is connected in a fluid-tight manner via flange 2 with the outlet opening of the hydraulic pump 1. The fluid transfer element 3 furthermore has a supply part 6, a connecting part 7 and a discharge part 8. The supply part 6 and the discharge part 8 are of tubular form. The connecting part 7 has the form and function of a T-shaped connector. The supply part 6 and connecting part 7 are rigidly connected together so as to form a T-shaped pipe branch. The supply part 6, connecting part 7 and discharge part 8 are connected together such that fluid expelled from the hydraulic pump 1 can be passed from the first end 4 via the supply part 6, connecting part 7 and discharge part 8 to another end 5 of the fluid transfer element 3 or discharge part 8. Furthermore, on the connecting part 7 is arranged a support element 9 of tubular design such that the discharge part 8, connecting part 7 and support element 9 form a linear channel through which fluid can flow.

Figure 2:
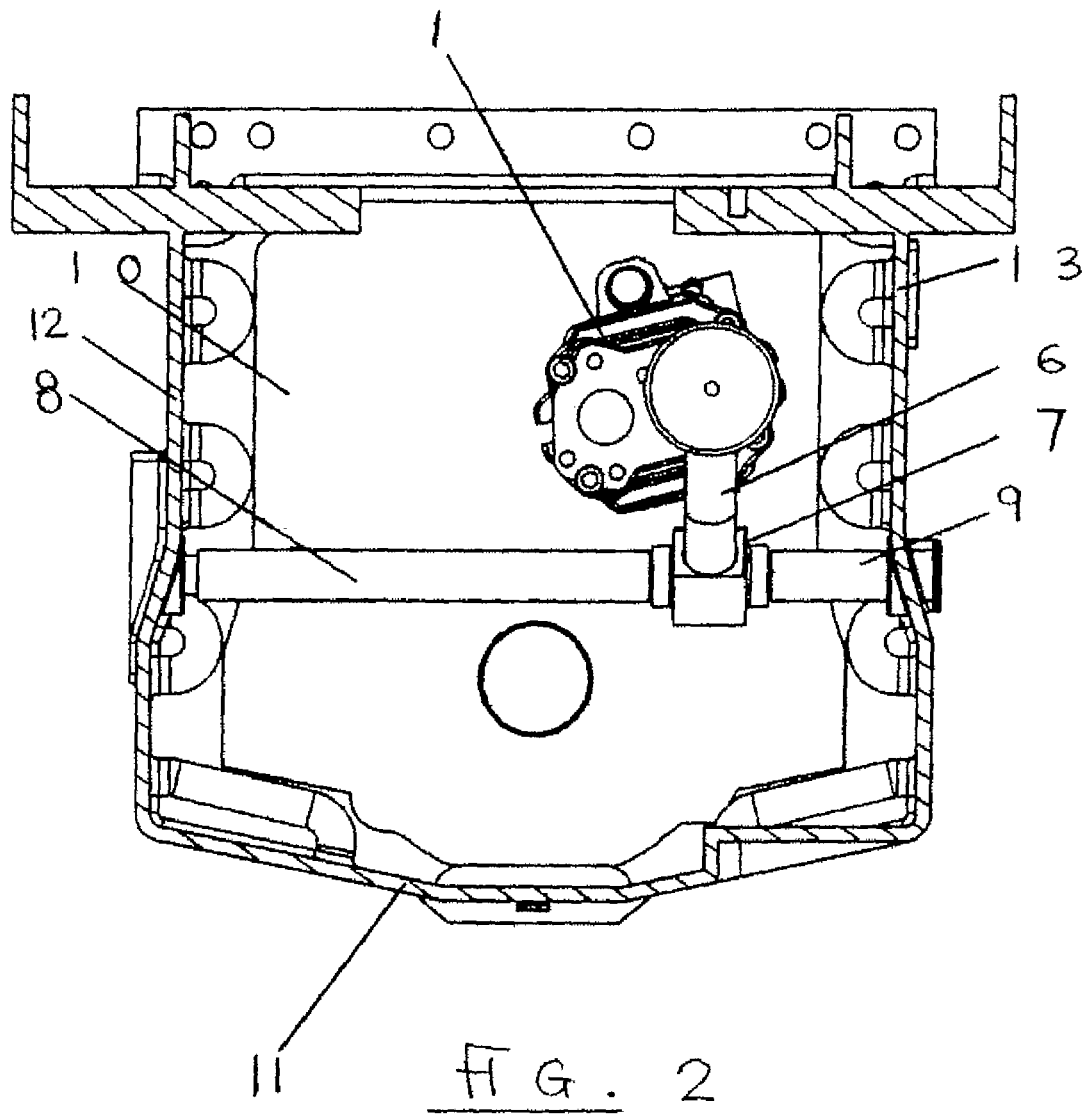
FIG. 2 shows a front view of a housing belonging to a gear assembly of an agricultural vehicle showing the pump of FIG. 1 in the position in the housing.

As shown in FIG. 2, the hydraulic pump 1, fluid transfer element 3 and support element 9 are mounted in a housing belonging to the gear assembly of an agricultural vehicle. The hydraulic pump 1 is attached by means of screw connection to a plate 10. The plate 10 is attached via a fixing means not shown to a fixed element, here a frame 11, wherein the frame 11 is formed as gear assembly housing of an agricultural tractor. The frame 11 has two vertical elements 12 and 13 and is of a robust design such that it can absorb and resist any forces occurring from the hydraulic circuit. Between the two vertical frame elements 12 and 13 are arranged the fluid transfer element 3 and support element 9.

Figure 3:
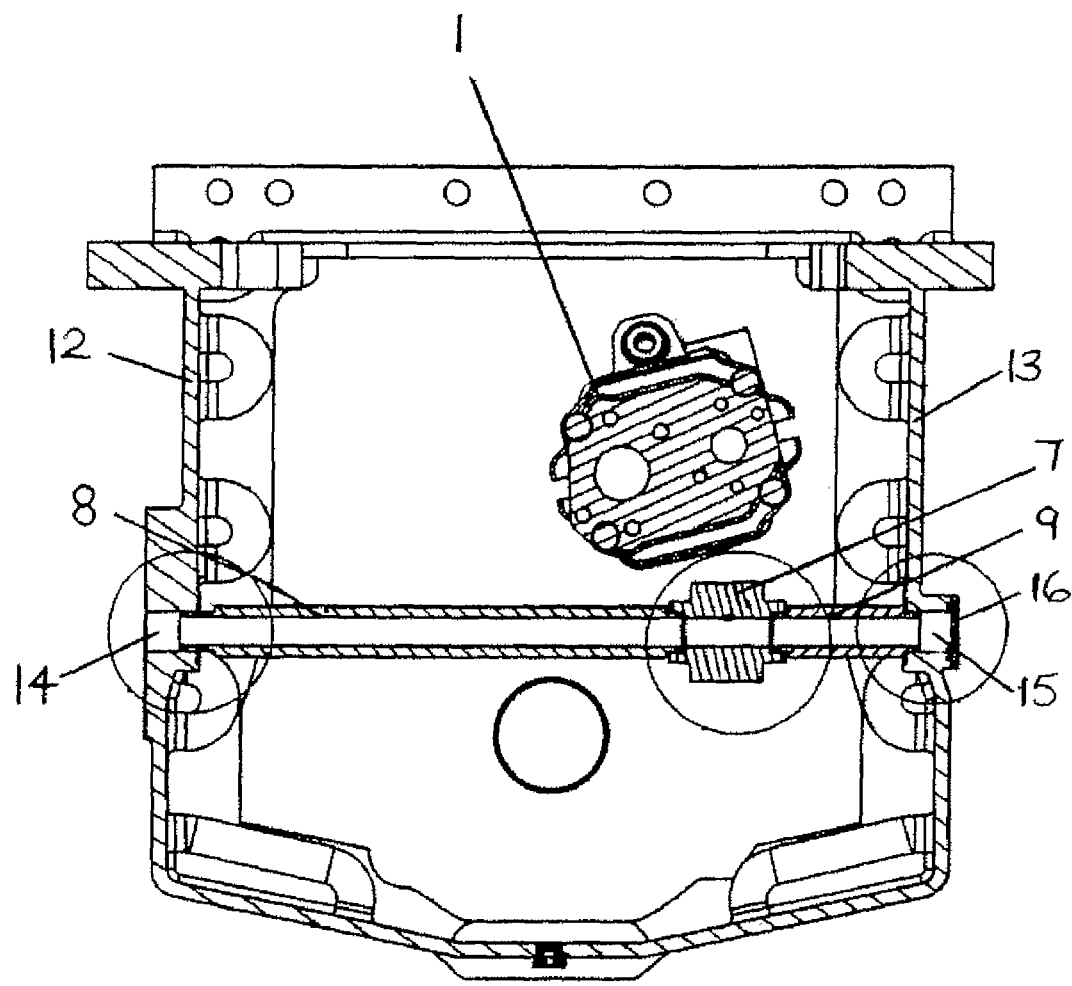
FIG. 3 shows a partly cut-away view of FIG. 2.

As is evident from FIG. 3, the vertical frame elements 12, 13 have a first through hole 14 and a second through hole 15 respectively. On the outside of the frame 11, a valve block not shown is connected as a consumer to the first through hole 14 via a pipe not shown. On the outside of the frame 11, the second through hole 15 is sealed with a cover 16 in a fluid-tight manner.

By removing the cover 16, a further consumer can be connected here via a further pipe.

Figure 4A:
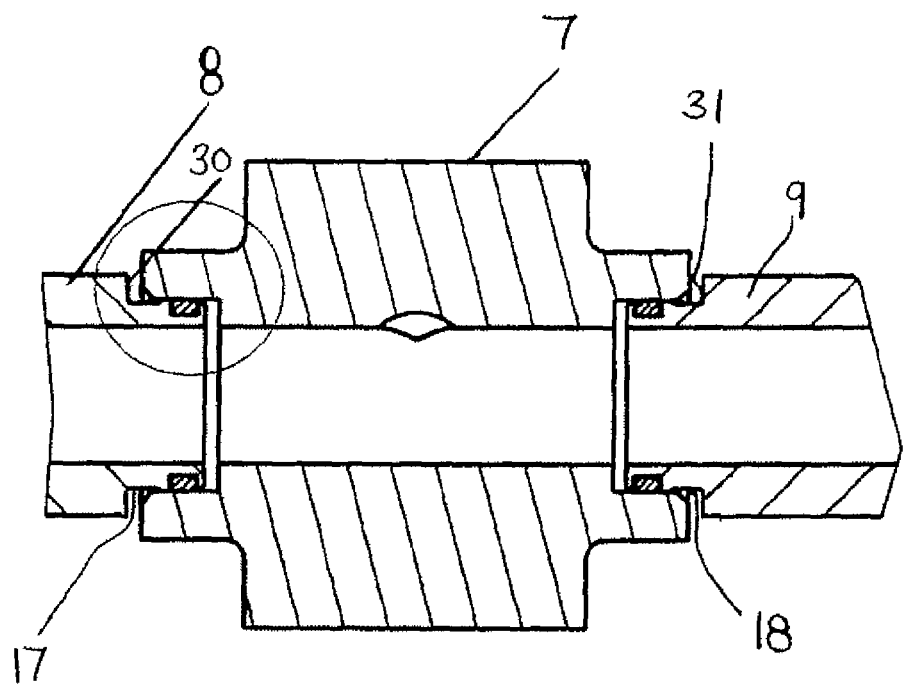
FIG. 4A shows a section view of a connecting element.
Figure 4B:
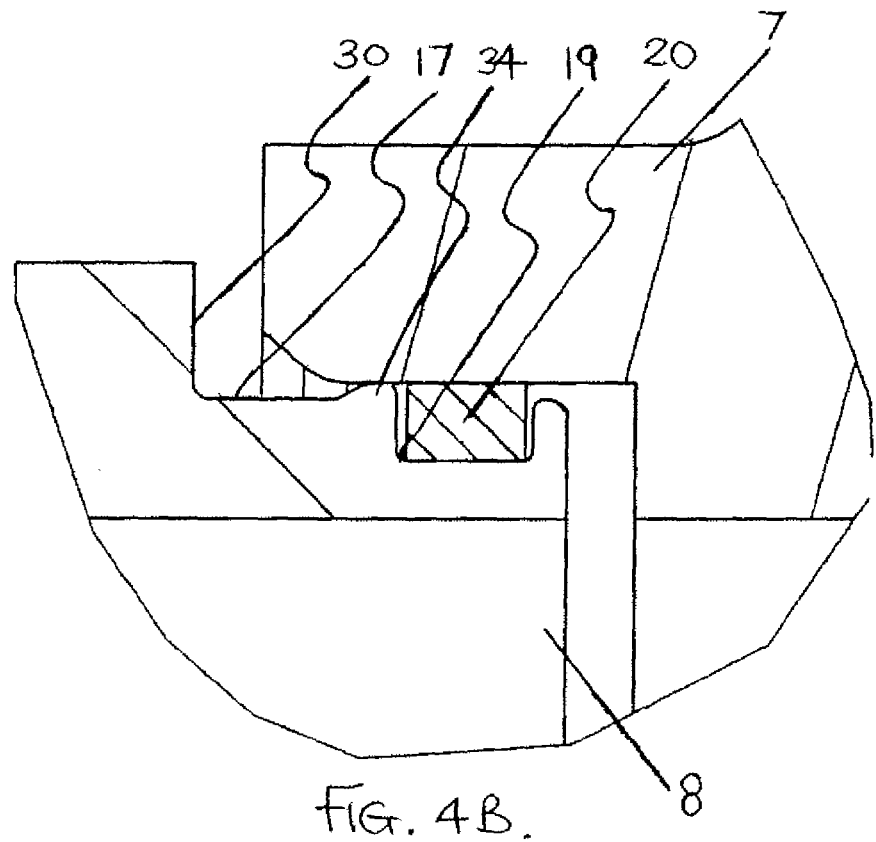
FIG. 4B shows an extract of FIG. 4A.

As is evident from FIGS. 4a and 4B, the discharge part 8 and support element 9 are connected with the connecting part 7 such that an out peripheral surface section 17 or 18 on the discharge part 8 and support element 9 are introduced into the connecting part which acts as a sleeve. Here, the outer peripheral surface sections 17 and 18 and corresponding sections of connecting part 7 are structured identically and are described below with reference to the peripheral surface section 17.

The peripheral surface section 17 shown in FIG. 4B is a circular cylindrical area on an axial end of discharge part 8 pointing towards the connecting part 7. In this area the outer radius of the discharge part 8 is reduced for example by the removal of wall material (for example by turning). One end of the peripheral surface section 17 is defined by the end of the discharge part 8. The other end in the axial direction, of the peripheral surface section 17 is defined by a stop 30 in the form of a shoulder, or a radially aligned surface as a transition between the reduced radius of the peripheral surface section 17 and the radius of the discharge part 8. One end of the peripheral surface section 17 is formed with a peripheral convex protrusion 34. On the apex line of the protrusion 34 is formed a receiver groove 19 surrounding the peripheral surface section 17. In the receiver groove 19 is arranged a sealing ring 20. In this embodiment example, the protrusion 34 and receiver groove 19 are designed such that the receiver groove 19 is not on the apex line but close to it. Therefore, the peripheral surface section 17 on a side facing the connecting part 7 is smaller than on a side facing away from connecting part 7, so that an angle offset is possible between parts 7 and 8.

Figure 7:
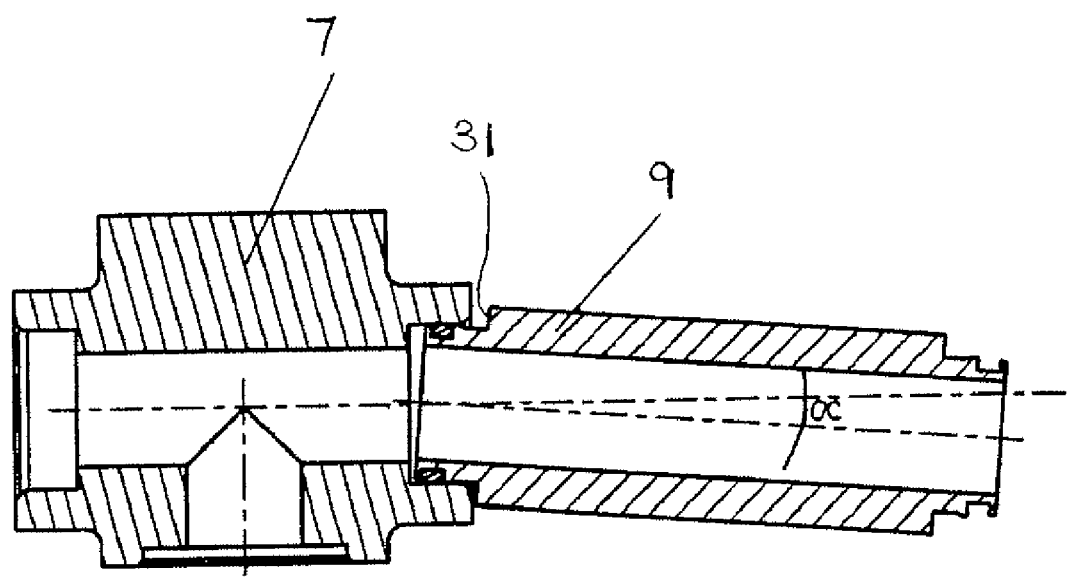
FIG. 7 shows a section view of a connecting element and the support element.

The opening of the connecting part 7, in which the peripheral surface section 17 is introduced in the form of a sleeve, has a radius and a depth which allow a fluid-tight connection to be created between the discharge part 8 and the connecting part 7. The edge surrounding the opening between the outside of the connecting part 7 and the opening is chamfered. Due to the peripheral protrusion 34 of the outer peripheral surface section 17 and the chamfering of the opening of the connecting part 7, as shown as an example in FIG. 7 with reference to the connecting part 7 and the support element 9, a deflection (angle offset) of the discharge part 8 and connecting element 9 is possible by an angle a in the range from 0° to 5° in all directions perpendicular to the central axes of the discharge part 8 and support element 9. Furthermore, the discharge part 8 is displaceable in the axial direction relative to the connecting part 7. This mobility is limited in one direction by the stop 30 of the peripheral surface section 17 to ensure a minimum length of the assembled system of discharge part 8, connecting part 7 and support element 9. In the same way as the peripheral surface section 17, the opening of the connecting part 7 has a stop in the form of a shoulder, or a radially aligned surface as a transition to an opening section with smaller diameter. The stop of the connecting part 7 has the same function as the stop 30 of the peripheral surface section 17.

Figure 5:
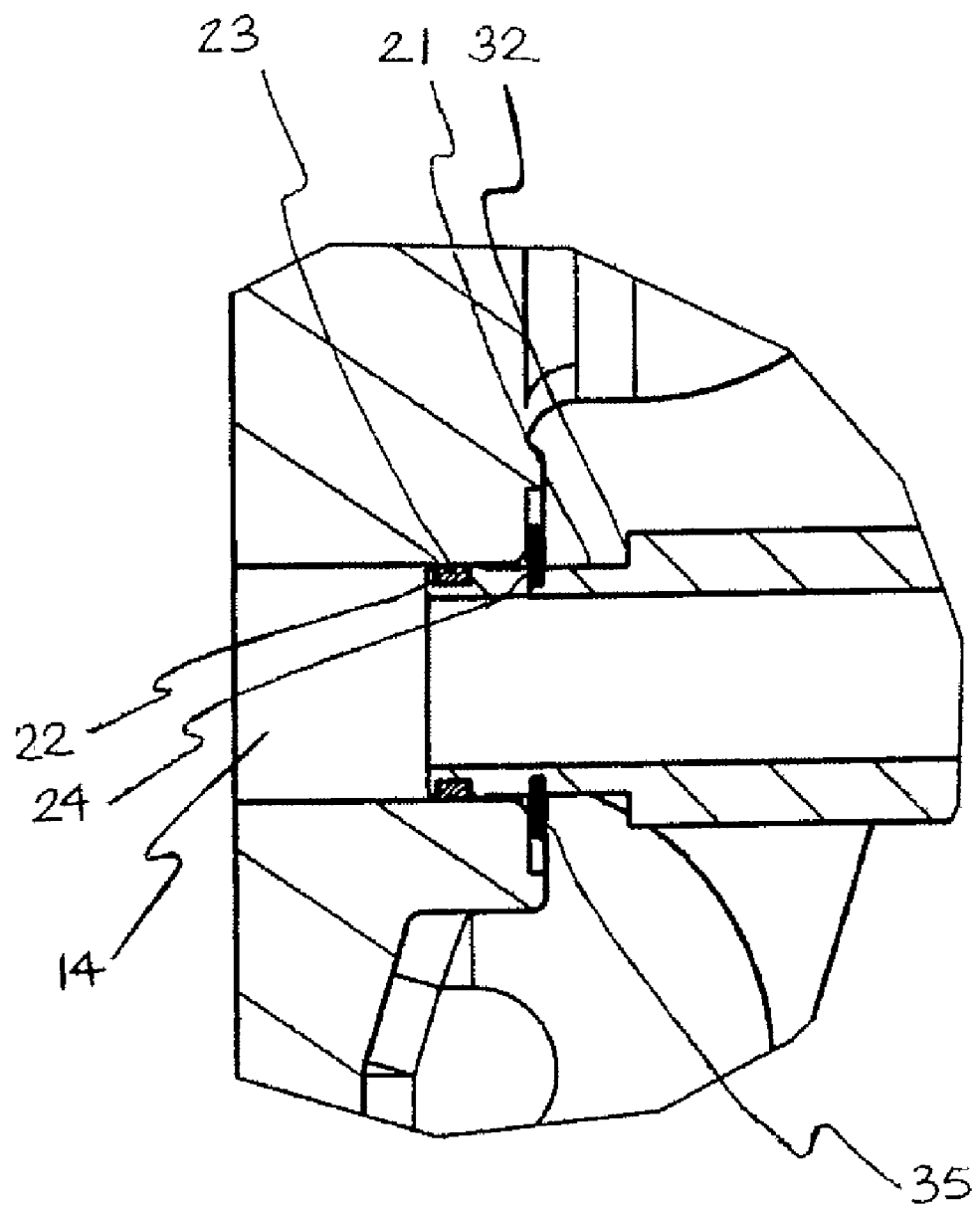
FIG. 5 shows a section view of another end of the fluid transfer element.

As shown in FIG. 5, the other end 5 of the fluid transfer element 3 is introduced, in the form of a sleeve, with an outer peripheral surface section 21 at the end of discharge part 8, into the second through hole 14. The peripheral surface section 21 is here in principle structured as the peripheral surface section 17. The outer peripheral surface section 21 is structured such that its diameter is smaller than the diameter of the first through hole 14. The peripheral surface section 21 like the peripheral surface section 17 is limited in the axial direction on one side by a stop 32 in the form of a shoulder. However, the peripheral surface section 21 in the axial direction has a dimension which is greater than the dimension of the peripheral surface section 17 in the axial direction. This greater dimension of the peripheral surface section 21 is not necessary for operation of the hydraulic circuit but serves for simpler assembly. The outer peripheral surface section 21 has a first groove 22 to receive a sealing ring 23 to create a fluid-tight connection of the discharge part 8 with the through hole 14. The outer peripheral surface section 21 furthermore has a second groove 24 to receive a locking ring 35. The second groove 24 is arranged at one point at the outer peripheral surface so that the dimension of the peripheral surface section 21 in the axial direction, by which the discharge part 8 can be inserted in the first through hole 14, is limited by the locking ring. By means of a protrusion on the peripheral surface section 21 at the first groove 22, in a manner corresponding to the protrusion 34 of the peripheral surface section 17, the discharge part can also be deflected in relation to the axial direction of the first through hole 14, by 0° to 5° in all directions perpendicular to the central axis of the discharge part 8.

Figure 6:
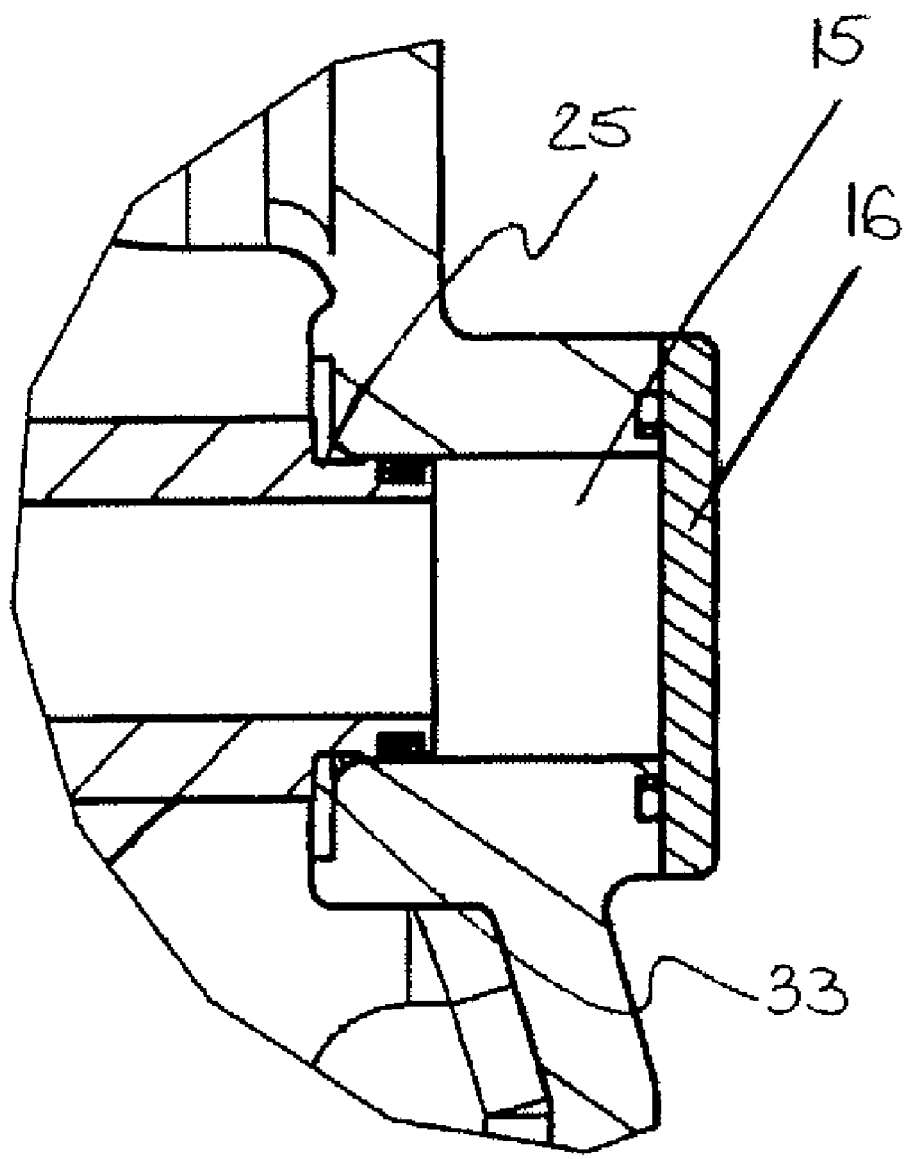
FIG. 6 shows a section view of a support element.

As shown in FIG. 6, one end of the support element 9 is introduced, with an outer peripheral surface section 25 at the end of support element 9, into the second through hole 15 in the form of a sleeve. The outer peripheral surface section 25 is formed like the outer peripheral surface section 18 of the support element 9.

The assembly of the vibration-decoupling device is described below.

After fixing the hydraulic pump 1 to the plate 10 in FIG. 2, discharge part 8, connecting part 7 and support element 9 are joined together as a sleeve so as to form a pipe deflectable at the connecting points. The supply part 6 is attached in a rigid manner at the connecting element 7. The outer peripheral surface section 21 of discharge part 8 is inserted by its entire length in the axial direction into the first through hole 14 until the stop 32 of the peripheral surface section 21 lies on the frame 11 and the one end of the support element 9 can be arranged in front of the second through hole 15. By withdrawing the peripheral surface section 21 from the first through hole 14, the peripheral surface section 25 of the support element 9 is inserted in the second through hole 15 until the stop 33 of the peripheral surface section 25 lies on the frame 11. By applying the locking ring to the second groove 24, the arrangement is fixed such that a reversal of the assembly procedure is prevented. Finally, the supply line 6 is connected via flange 2 with the hydraulic pump 1 in a fluid-tight manner by screw fit.

The operation of the vibration-decoupling device is explained below.

In operation, a hydraulic fluid is in the supply part 6, connecting part 7 and discharge part 8, which form the fluid transfer element 3, and in support element 9. When the hydraulic pump 1 is operated, this fluid is placed under high pressure. The pressure causes the forces acting in opposition to be applied to the first perpendicular frame element 12 and second perpendicular frame element 13. As these forces are not applied via the fluid transfer element 3 and support element 9 but by the fluid directly onto the frame, no forces act on the fluid transfer element 3 in a direction which could lead to a shift or position change of same.

On operation of the hydraulic pump 1, mechanical vibrations occur which are transmitted via the fixed connection through the flange 2 to the supply part 6. Vibration decoupling is achieved firstly in that the device allows movement of the outer peripheral surfaces 17, 18, 21 and 25 in the axial direction. As a result and due to the design of the connections of the connecting part 7 with the discharge part 8 and the support element 9, the connecting part 7 can be moved over particular distances along all three spatial axes and twisted through a particular angle about all three spatial axes.

This guarantees that vibrations which are transmitted to the fluid transfer element 3 are decoupled in each direction and all forces occurring are absorbed by the frame 11.

By the possibility of using simple pipe elements or parts that are simple to produce, and the possibility of simple assembly, cost savings are possible despite the high reliability.

It is clear to the person skilled in the art that the concept of the invention can be structured differently from the embodiment example described. For example it is possible for the fluid transfer element 3 to be formed as a one-piece curved pipe element and for the support element to consist of any arbitrarily designed spacer which is arranged deflectably between the pipe bend and the second vertical element 13 of the frame 11. This indeed achieves lesser but often adequate decoupling of the mechanical vibrations and absorption of the forces occurring through the frame; however further cost savings are possible by a reduction in components.

It can also be sufficient for the connecting part 7 to be moveable only along one spatial axis or only rotatable about one spatial axis if the mechanical vibrations are limited in their transmission.

Furthermore, it is not necessary for the hydraulic circuit to be guided through the first through hole 14 and the second through hole 15 onto the outside of the frame 11. It is also possible that on the inside of the frame 11, pipe connection pieces or receiver sockets are arranged to receive the support element 9 and/or discharge part 8 and that the hydraulic circuit is continued through pipes on the inside of the frame 11. This is advantageous if a consumer is to be arranged inside the frame 11.

The invention claimed is:

1. A vibration-decoupling device for hydraulics comprising:
    a fluid transfer element (3) of tubular form with a first end (4) and a second end (5), the first end (4) being suitable for being connected with a high pressure outlet of a hydraulic pump (1) for transporting fluid expelled therefrom,
    a fixed element (11), being a frame or a housing which is suitable for resisting mechanical vibrations and pulsations of the fluid caused by operation of the hydraulic pump (1),
    second end (5) of the fluid transfer element (3) is moveably connected within fixed element (11) to allow movement of the transfer element (3) in an axial direction and in at least one direction orthogonal to the axial direction so that fluid can be passed to a hydraulic consumer, and
    a support element (9) of tubular form is moveably connected with the fixed element (11) and the fluid transfer element (3) to allow movement of the support element (9) and transfer element (3) in an axial direction and in at least one direction orthogonal to the axial direction and acts so that a supporting force is exerted on the fluid transfer element (3) in one direction while the second end (5) of the fluid transfer element (3) and the fixed element (11) remain securely connected together.

2. A vibration-decoupling device according to claim 1, wherein
    the fluid transfer element (3) has a supply part (6), a connecting part (7) and a discharge part (8),
    the supply part (6) and the discharge part (8) being of tubular form,
    the connecting part (7) being structured such that it connects the supply part (6), discharge part (8) and support element (9) so that fluid can be guided from the supply part (6) to the discharge part (8) and at least one of the supply part (6), the discharge part (8) and support element (9) being moveably connected with the connecting part (7).

3. A vibration-decoupling device according to claim 2, wherein the connecting part (7), discharge part (8) and support element (9) are connected together so that a shift of the discharge part (8) and/or support element (9) in the axial direction relative to the connecting part (7) and in at least one direction orthogonal to the axial direction is possible.

4. A vibration-decoupling device according to claim 1, wherein
    the fixed element (11) has a first through hole (14),
    the second end (5) of the fluid transfer element (3) are connected in a fluid-tight manner with the first through hole (14), so that a shift of the fluid transfer element (3) or part thereof in the axial direction in relation to the first through hole (14), and/or a deflection of the fluid transfer element (3) or part thereof by up to so in at least one direction orthogonal to the axial direction is possible.

5. A vibration-decoupling device according to claim 3, wherein
the fixed element (11) has a second through hole (15) and the support element (9) are connected in a fluid-tight manner with the second through hole (15), so that a shift of the support element (9) or parts thereof in the axial direction in relation to the second through hole (15), and/or a deflection of the support element or parts thereof by up to so in at least one direction orthogonal to the axial direction of the second through hole (15) is possible.

6. A vibration-decoupling device according to claim 5, wherein the second through hole (15) can be connected with a further consumer.

7. A vibration-decoupling device according to claim 2, wherein the discharge part (8) has two end sections (17, 21), the external diameter of which is reduced to form a shoulder (30, 32), wherein along the end section (17, 21) is provided a radial peripheral convex protrusion with an apex line, and
along the apex line is provided a receiver groove (19, 22) which is suitable for holding a sealing ring (20, 23).

8. A vibration-decoupling device according to claim 2, wherein
the support element (9) has two end sections (18, 25), the external diameter of which is reduced to form a shoulder (31, 33), wherein along the end section (18, 25) is provided a radial peripheral convex protrusion with an apex line, and
along the apex line is provided a receiver groove which is suitable for holding a sealing ring.

9. A vibration-decoupling device according to claim 7, wherein the receiver groove is displaced relative to the apex line so that the end section on the one side of the receiver groove has a smaller diameter than on the other side of the receiver groove.

10. A vibration-decoupling device according to claim 8 wherein the receiver groove is displaced relative to the apex line so that the end section on the one side of the receiver groove has a smaller diameter than on the other side of the receiver groove.

11. A vibration-decoupling device according to claim 2, wherein
the connecting part (7) has two opposing ends,
an opening is provided at both ends and the opening, the opening having
an inner peripheral surface of circular cylindrical form, the radius and surface roughness thereof allowing the receiving of an end section (17, 18) of the discharge part (8) and support element (9) respectively in a fluid-tight manner, the opening also having a peripheral edge which is chamfered and the inner end of the peripheral surface being defined in the axial direction by shoulder in the connecting part (7).

12. A vibration-decoupling device according to claim 1, wherein
the fluid transfer element (3) has a supply part (6), a connecting part (7) and a discharge part (8),
the supply part (6) and the discharge part (8) being of tubular form,
the connecting part (7) being structured such that it connects the supply part (6), discharge part (8) and support element (9) so that fluid can be guided from the supply part (6) to the discharge part (8) and at least one of the supply part (6), the discharge part (8) and support element (9) being moveably connected with the connecting part (7), and wherein
the fixed element (11) has a first through hole (14),
the second end (5) of the fluid transfer element (3) are connected in a fluid-tight manner with the first through hole (14), so that a shift of the fluid transfer element (3) or part thereof in the axial direction in relation to the first through hole (14), and/or a deflection of the fluid transfer element (3) or part thereof by up to so in at least one direction orthogonal to the axial direction is possible.

13. A vibration-coupling device according to claim 1, wherein
the connecting part (7), discharge part (8) and support element (9) are connected together so that a shift of the discharge part (8) and/or support element (9) in the axial direction relative to the connecting part (7) and in at least one direction orthogonal to the axial direction is possible, and wherein
the fixed element (11) has a first through hole (14),
the second end (5) of the fluid transfer element (3) are connected in a fluid-tight manner with the first through hole (14), so that a shift of the fluid transfer element (3) or part thereof in the axial direction in relation to the first through hole (14), and/or a deflection of the fluid transfer element (3) or part thereof by up to so in at least one direction orthogonal to the axial direction is possible.

14. A vibration-decoupling device for hydraulics comprising:
a fluid transfer element (3) with a first end (4) and a second end (5), the first end (4) being suitable for being connected with a high pressure outlet of a hydraulic pump (1) for transporting fluid expelled therefrom,
a fixed element (11), being a frame or a housing which is suitable for resisting mechanical vibrations and pulsations of the fluid caused by operation of the hydraulic pump (1),
second end (5) of the fluid transfer element (3) is moveably connected with the fixed element (11) so that fluid can be passed to a hydraulic consumer, and
a support element (9) which is moveably connected with the fixed element (11) and the fluid transfer element (3) and acts so that a supporting force is exerted on the fluid transfer element (3) in one direction while the second end (5) of the fluid transfer element (3) and the fixed element (11) remain securely connected together, wherein
the fluid transfer element (3) has a supply part (6), a connecting part (7) and a discharge part (8), the supply part (6) and the discharge part (8) being of tubular form, the connecting part (7) being structured such that it connects the supply part (6), discharge part (8) and support element (9) so that fluid can be guided from the supply part (6) to the discharge part (8) and at least one of the supply part (6), the discharge part (8) and support element (9) being moveably connected with the connecting part (7), and wherein
the support element (9) is of tubular form and the connecting part (7), discharge part (8) and support element (9) are connected together so that a shift of the discharge part (8) and/or support element (9) in the axial direction relative to the connecting part (7) and in at least one direction orthogonal to the axial direction is possible, and wherein
the fixed element (11) has a second through hole (15) and the support element (9) are connected in a fluid-tight manner with the second through hole (15), so that a shift of the support element (9) or parts thereof in the axial direction in relation to the second through hole (15), and/or a deflection of the support element or parts thereof by up to so in at least one direction orthogonal to the axial direction of the second through hole (15) is possible.

15. A vibration-decoupling device according to claim 14, wherein the second through hole (15) can be connected with a further consumer.

16. A vibration-decoupling device according to claim 14, wherein the discharge part (8) has two end sections (17, 21), the external diameter of which is reduced to form a shoulder (30, 32), wherein along the end section (17, 21) is provided a radial peripheral convex protrusion with an apex line, and along the apex line is provided a receiver groove (19, 22) which is suitable for holding a sealing ring (20, 23).

17. A vibration-decoupling device according to claim 14, wherein the support element (9) has two end sections (18, 25), the external diameter of which is reduced to form a shoulder (31, 33), wherein along the end section (18, 25) is provided a radial peripheral convex protrusion with an apex line, and along the apex line is provided a receiver groove which is suitable for holding a sealing ring.

18. A vibration-decoupling device according to claim 14, wherein the receiver groove is displaced relative to the apex line so that the end section on the one side of the receiver groove has a smaller diameter than on the other side of the receiver groove.

19. A vibration-decoupling device according to claim 14 wherein the receiver groove is displaced relative to the apex line so that the end section on the one side of the receiver groove has a smaller diameter than on the other side of the receiver groove.

20. A vibration-decoupling device according to claim 14, wherein the connecting part (7) has two opposing ends, an opening is provided at both ends and the opening, the opening having an inner peripheral surface of circular cylindrical form, the radius and surface roughness thereof allowing the receiving of an end section (17, 18) of the discharge part (8) and support element (9) respectively in a fluid-tight manner, the opening also having a peripheral edge which is chamfered and the inner end of the peripheral surface being defined in the axial direction by shoulder in the connecting part (7).

* * * * *